United States Patent
Zaun et al.

(10) Patent No.: US 6,591,875 B2
(45) Date of Patent: Jul. 15, 2003

(54) CART FOR BULK FILLING INTERMODAL CONTAINERS

(75) Inventors: Richard D. Zaun, West Des Moines, IA (US); Richard W. Hook, West Des Moines, IA (US); Bruce L. Warman, East Moline, IL (US); Gregory M. Knott, Davenport, IA (US); John M. Robinson, Eagan, MN (US); Christopher G. Kay, Roseville, MN (US); Mark Guterman, Apple Valley, MN (US); Dmitry I. Spivak, Eagan, MN (US); Thomas E. Sparrow, Hawley, MN (US); John A. Madson, Lake Park, MN (US); Jon Ambuehl, Hawley, MN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/970,235

(22) Filed: Oct. 1, 2001

(65) Prior Publication Data

US 2003/0062096 A1 Apr. 3, 2003

(51) Int. Cl.[7] .................................................. B65B 1/04
(52) U.S. Cl. ........................ 141/231; 141/256; 141/284; 141/286; 141/67
(58) Field of Search ................................ 141/231, 256, 141/284, 286, 67; 414/318, 291

(56) References Cited

U.S. PATENT DOCUMENTS

| | | | |
|---|---|---|---|
| 3,757,881 A | * | 9/1973 | Short et al. |
| 3,818,955 A | * | 6/1974 | Kline |
| 4,045,041 A | | 8/1977 | Risser et al. |
| 4,125,194 A | * | 11/1978 | Price et al. |
| 4,274,790 A | * | 6/1981 | Barker |
| 4,348,872 A | * | 9/1982 | Hill |
| 4,420,119 A | * | 12/1983 | Johnson |
| 4,526,265 A | * | 7/1985 | Enns |
| 5,100,281 A | * | 3/1992 | Grieshop |
| 5,165,512 A | * | 11/1992 | Driear |
| 5,359,838 A | | 11/1994 | Madsen |
| 5,850,656 A | * | 12/1998 | Smith et al. |
| 6,047,982 A | * | 4/2000 | McClure et al. |
| 6,415,909 B1 | | 7/2002 | Mitchell et al. |
| 2001/0029996 A1 | * | 10/2001 | Robinson |

FOREIGN PATENT DOCUMENTS

| | | |
|---|---|---|
| DE | 196 12 053 | 10/1997 |
| GB | 701 271 | 12/1953 |
| GB | 846 632 | 8/1960 |
| GB | 1 057 641 | 2/1967 |
| GB | 2 303 115 | 2/1997 |
| WO | WO 00 73182 | 12/2000 |

* cited by examiner

Primary Examiner—Gregory Huson
Assistant Examiner—Khoa D Huynh

(57) ABSTRACT

A cart for filling intermodal shipping containers with a bulk particulate material, such as grain, includes a hopper to receive the bulk material and a belt conveyor to deliver the material to the container. The conveyor is positioned external of the container and throws the material along an arcuate path to the opposite end of the container whereby the container is substantially filled without the need to extend the conveyor into the container. The cart is supported on wheels to be moved where needed. The cart can straddle a standard truck trailer carrying a container so that the container need not be removed from the trailer for filling. The conveyor height is variable to reach a container on a truck trailer or on the ground. The cart width can also be reduced for road transport.

34 Claims, 3 Drawing Sheets

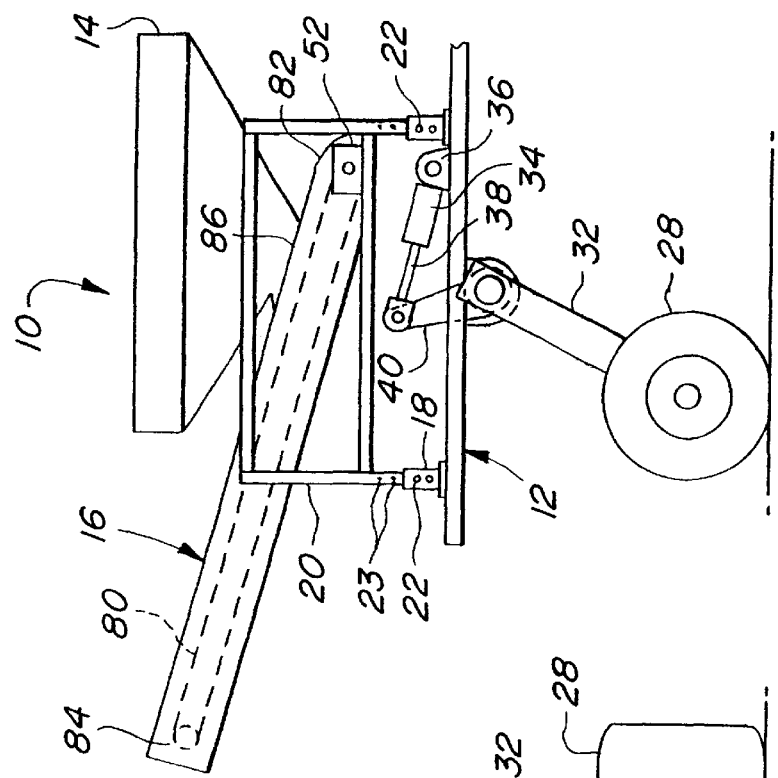
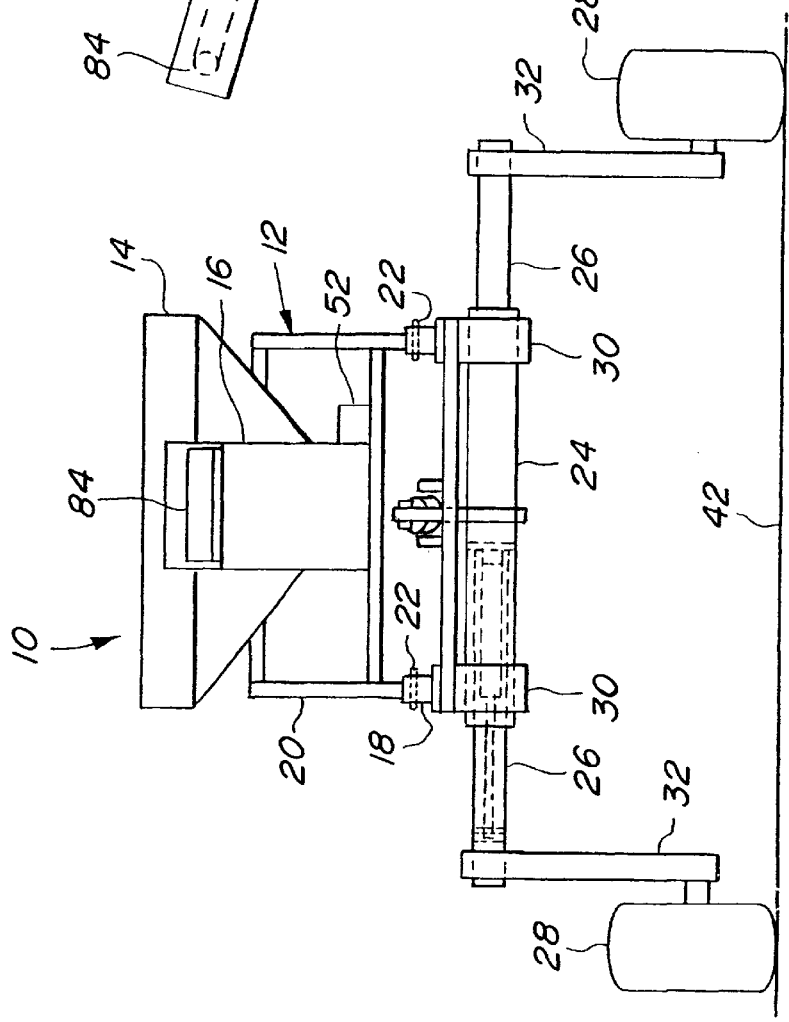
Fig. 1
Fig. 2

CART FOR BULK FILLING INTERMODAL CONTAINERS

FIELD OF THE INVENTION

The present invention relates to a cart for bulk filling intermodal containers and in particular for filling containers with agricultural produce, such as grain, beans, seed, etc., either in the field as the crop is harvested or from storage.

BACKGROUND OF THE INVENTION

Current grain production, transportation and handling systems are largely based on a bulk commodity approach. Many crops are harvested by a combine or similar machines which, in addition to harvesting the crop, separates the grain, bean, seed, etc. from the remainder of the plant material. The crop is off-loaded from the harvester into a grain cart, truck trailer, etc. and transported to a farm storage facility, local grain elevator, a processor, etc. At the farm storage facility, the grain may be dried and stored in a bin for later transport from the farm. If delivered directly to a local elevator, the grain may be dried, cleaned, etc. and stored there. The crop is later transported by truck, rail or barge to a food processor or to a terminal elevator for transport overseas. The bulk commodity system is highly efficient at moving large quantities of crops. One draw back of the bulk commodity approach is the limited ability to differentiate crops based on various crop characteristics. For the most part, crops are graded and classified according to a board of trade classification. For example, much corn is sold or graded as number two yellow corn and meets the minimum characteristics established by the board of trade for that classification.

Crop processors and food producers have characteristics other than those used by the board of trade that they seek to utilize in food or other product production processes. Recent advances in plant science have produced crops having differentiated output traits such as high oil crops. Other crops have been developed for certain pharmaceutical or nutriceutical properties. Biotechnology has used genetic modification to produce crops having certain specialized agronomic properties. While these genetically modified (GMO) crops provide benefits to the producer, some consumers prefer to avoid genetically modified food products. In response, many regulators have adopted or are considering regulations that require food products to be labeled to indicate the presence and/or absence of GMO ingredients. Other consumers desire food products that are produced organically. Organic food production largely avoids the bulk systems due to small volumes and the inability to properly segregate the organic products from the non-organically produced products.

For the various reasons described above, it is desirable to provide an alternative to the bulk commodity system. There is a need for a system that allows for segregation of crops having different characteristics while still providing efficient transportation of these products.

One way to segregate crops and maintain the segregation throughout the transportation system is to ship crops in containers, such as an intermodal shipping container. Once containerized, the products can be shipped to the processor without additional handling of the crop or opportunity for commingling with other crops. In addition to maintaining the segregation, containerized crops are handled fewer times, reducing handling induced grain damage. Currently, some crops are shipped in bulk containers. Most of these crops are placed in containers at elevators or processing facilities. While some crops have been containerized at the farm site, the lack of efficient and economical means for filling and handling containers on the farm site prevents wide spread use of containers for transporting grain and other agricultural products.

SUMMARY OF THE INVENTION

The present invention provides a cart for use in bulk filling a shipping container at the point of harvest or at a storage facility. The cart preferably has a wheeled chassis so as to be portable. In a preferred embodiment, the cart is used in combination with an agricultural tractor and utilizes power from the tractor. The cart includes a main frame supported by the wheels. The frame supports a hopper for receiving a crop (hereinafter "grain") and a conveyor that moves the grain from the hopper and into a container. The container is filled through either an upper door at the nose end of the container or through the container rear doors with a bulkhead installed inside the container. The bulkhead is open at the top, allowing the container to be filled over the bulkhead.

The hopper receives grain either from a combine, grain cart or from a discharge port of a storage facility. The container remains on a truck trailer while it is filled. The height of the cart is adjustable to meet with a container on trailers of various heights. The cart can also be lowered to meet a container that has been placed on the ground. The wheels on the cart are extendable laterally to straddle a truck trailer such that a rear portion of a trailer can be backed under the cart until the conveyor meets the container door. The wheels can be retracted to reduce the width of the cart to meet transport width requirements for moving the cart.

The conveyor is a belt conveyor having a width of about 24 inches. The belt is supported on a trough shaped metal base between the conveyor ends. Cleats on the belt engage the grain to accelerate the grain to the belt speed. The belt is inclined at an angle and operated at a speed necessary to throw the grain into the container at one end and travel along an arcuate trajectory to the opposite end of the container preferably without striking the top of the container. This allows the container to be substantially filled without extending the conveyor into the container. By not extending the conveyor into the container, the need to coordinate withdrawal of the conveyor as the container is filled is eliminated. In a preferred embodiment, the conveyor is inclined at approximately a 15 degree angle and the belt is operated at about 2200 feet per second. This angle and speed allows a twenty foot intermodal container to be filled in less than five minutes. Depending on the grain and moisture, the container will reach its weight limit before it is filled by volume. The weight limit may not be the container weight limit but the weight limit for road transport of the filled container. The road weight limit depends on various factors including the number and spacing of axles supporting the container. As used herein, the term "substantially filled" is either by weight or by volume.

BRIEF DESCRIPTION OF THE DRAWINGS

FIG. 1 is a side elevational view of the cart of the present invention.

FIG. 2 is a rear view of the cart of the present invention.

DESCRIPTION OF THE PREFERRED EMBODIMENT

Figure 3:
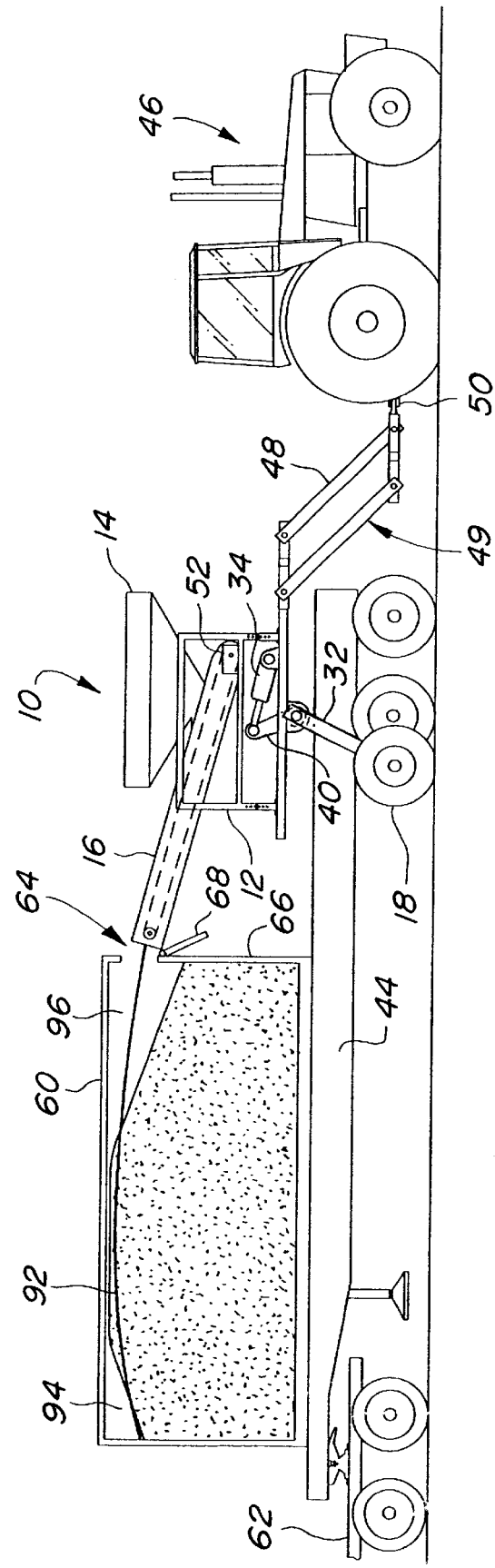
FIG. 3 is a side view of the cart shown together with a tractor illustrating the filling of an intermodal container on a flatbed trailer.

The cart of the present invention is shown in FIG. 1 and designated generally at 10. The cart 10 includes a frame 12 that supports a hopper 14 and a belt conveyor 16. The frame has a lower portion 18 and an upper portion 20 connected to the hopper and conveyor. The upper portion 20 is removably attached to the lower portion through removable fasteners, such as nut and bolt assemblies 22. The removable fasteners allow the frame upper portion 20 to be removed from the frame lower portion 18 for use of the hopper and conveyor elsewhere. A series of apertures 23 in the frame legs allows the position of the frame upper portion to be adjusted relative to the frame lower portion.

The frame lower portion 18 carries a transverse member 24 with left and right telescoping tubes 26 extending laterally outward from the member 24 in opposite directions. The transverse member 24 is rotatably mounted to the frame 12 by bearing blocks 30. Left and right wheel arms 32 are fixed at the outboard ends of the left and right telescoping tubes 26. Each wheel arm carries a wheel and tire assembly 28. A hydraulic cylinder 34 is coupled at one end to the frame 12 by a bracket 36 and has a rod 38 coupled to a crank 40 extending from the transverse member 24. Extension and retraction of the cylinder rod 38 thus causes rotation of the transverse member 24. This changes the height of the conveyor 16, the need for which is described below. Any of a variety of known lift or extension mechanisms can be used to raise and lower the conveyor including telescoping tubes, scissors mechanism, linkages, etc.

The telescoping tubes 26 are movable in and out of the transverse member 24 by hydraulic cylinders 43, only one of which is shown. One cylinder 43 is provided for each telescoping tube 26. The extension of the tubes 26 allows the tread width of the cart to be varied. When the tubes 26 are extended, the cart is wide enough to straddle a truck trailer such as the flatbed trailer 44 shown in FIG. 3. When retracted, the cart is narrow enough to meet road transport width limits, such as the three meter width limit in Europe. Other mechanisms can be used to adjust the width as well, including linkages, scissors mechanisms, etc. Alternatively, the tubes 26 can be manually moved in and out and bolted to the center transverse member 24 in either an extended position to straddle a trailer or a retracted position for highway transport. The height and width adjustability allows the cart to straddle a flatbed truck trailer as shown in FIG. 3. A standard flatbed trailer can have a height of 60 inches and a width of more than eight feet that must be straddled by the cart.

The cart 10 is shown in FIG. 3 coupled to an agricultural tractor 46. The cart 10 includes a tongue 48 coupled to the drawbar 50 of the tractor and attached to the frame 12. In a preferred embodiment, the tongue 48 is a self leveling tongue having a linkage 49 to maintain the conveyor at a predetermined angle of inclination regardless of the vertical position of the hopper and conveyor. The conveyor 16 is driven by a hydraulic motor 52 powered by the hydraulic system of the tractor 46 through standard hydraulic connections on the tractor. The tractor hydraulic system also operates the cylinders 38 to raise and lower the cart and the cylinders 43 varying the tread width. The conveyor can also be driven by an electric motor at the farm site or other location where electric power is available or driven mechanically by a tractor PTO.

Figure 4:
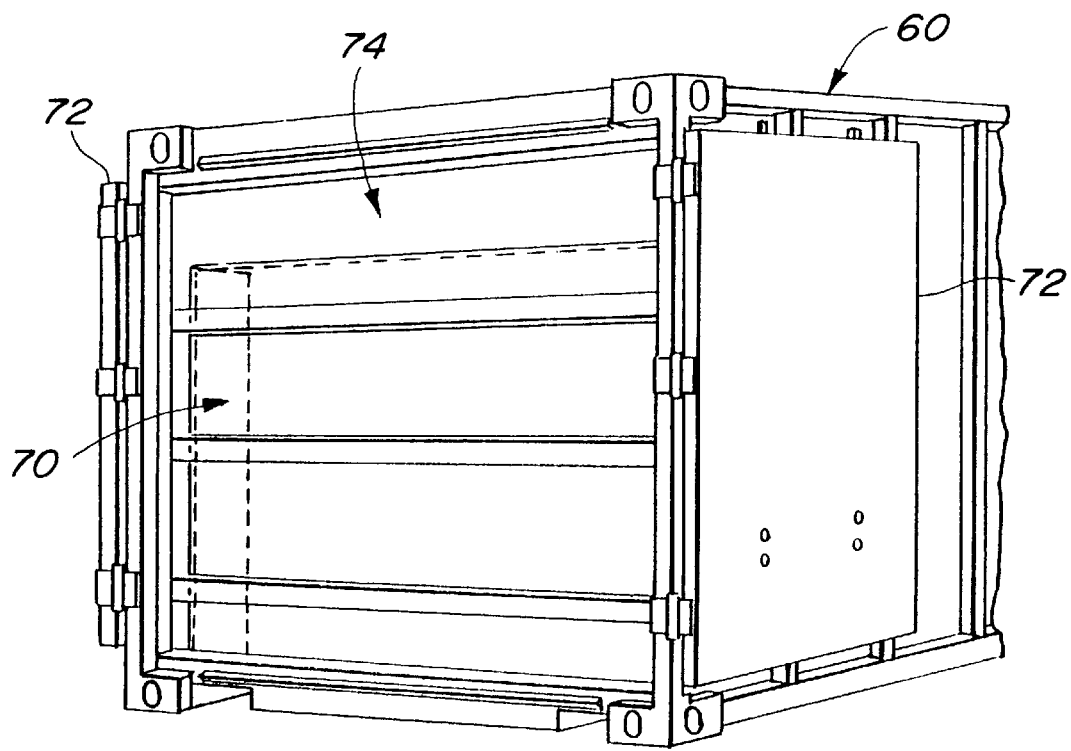
FIG. 4 is a perspective view of the rear of a container showing a bulkhead installed therein.

With reference again to FIG. 3, the cart is used to fill an intermodal shipping container 60 shown on the flatbed trailer 44 although other containers can be used. The container 60 preferably meets ISO standards for intermodal freight containers. The trailer is shown connected to the fifth wheel hitch of a semi-tractor 62. With the wheel and tire assemblies 18 of the cart spread apart, the trailer 44 is backed underneath the cart 10 until the upper end of the conveyor 16 reaches the fill opening 64 at the nose end 66 of the container. A door 68 for the fill opening is shown in an open position. The trailer 44 is a standard highway transport trailer equipped to carry an intermodal shipping container. As an alternative to the fill opening 64 in the nose end of the container, the container can be filled through the rear as shown in FIG. 4. A bulkhead 70 is installed in the container, immediately inside the container rear doors 72. The bulkhead 70 does not extend completely to the top of the container, leaving an opening 74 at the top of the bulkhead through which the container can be filled. Bulkheads of this type are known devices. One such bulkhead is shown in U.S. Pat. No. 6,206,623 B1.

Figure 5:
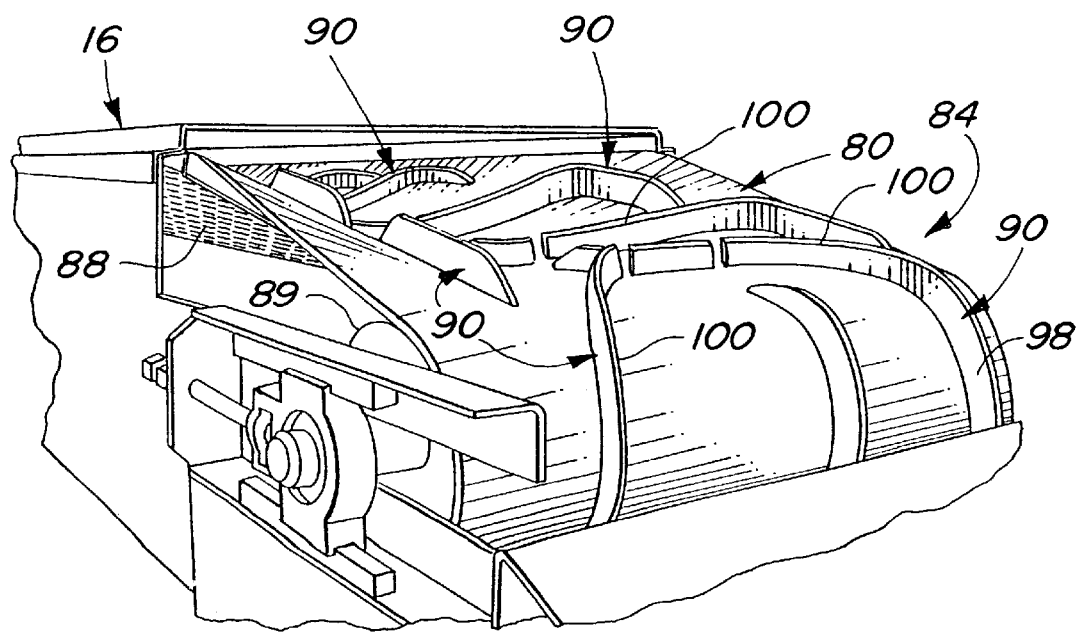
FIG. 5 is a perspective view of the conveyor upper end.

The conveyor 16 is a belt conveyor with a belt 80. The conveyor has lower and upper ends 82, 84 respectively and is driven at the lower end by the motor 52. The hopper outlet 86 is disposed above the conveyor near the lower end 82 and drops grain onto the belt 80. The belt 80 carries the grain to the conveyor upper end 84. Between the conveyor ends, the belt is supported on an expanded metal trough 88 (FIG. 5). The trough allows more grain to be piled onto the belt without spilling off the belt side edges as compared to a flat belt. The belt flattens to travel over rollers 89 at the conveyor ends. The belt has upstanding cleats 90 that engage the grain to move the grain pile along with the belt. The cleats have side portions 98 parallel to the sides of the belt to keep grain on the belt. Cleat portions 100 are inclined rearward and inward from the belt edges to engage the grain.

The conveyor is inclined and operated at a speed sufficient to throw the grain along an arcuate path 92 into the container through either the fill opening 64 or 74 and through the container to the opposite end. The path 92 allows the grain to reach the opposite end of the container preferably without the grain striking the top of the container. If a substantial amount of grain strikes the top of the container, the grain will fall and form a pile in the middle of the container. This will prevent the container from being filled. Substantial filling of the container is shown in FIG. 3 with only small spaces 94, 96 not filled in the front and the rear of the container. Complete volumetric filling of the container will likely result in the container exceeding weight limits for road transport. Testing has indicated that it may be possible to fill the container with belt speeds in the range of 1700–2300 feet per minute. In a preferred embodiment, the conveyor is inclined at approximately a 15 degree angle and is operated at a speed of about 2200 feet per second. This provides the necessary grain speed and trajectory to fill a twenty foot container with most, if not all of the grain, avoiding contact with the top of the container. With a 24 inch wide belt, a twenty foot container can be filled in less than five minutes. The fill rate can be increased by increasing the belt width. Since the belt rides in a trough, a fifty percent increase in belt width will produce more than a fifty percent increase in the fill rate.

Other types of conveyors may be used, such as a pneumatic conveyor. However, a belt conveyor is preferred as a pneumatic conveyor will require more power to operate at the desired fill rate as compared to the belt conveyor.

The cart 10 can be used in or adjacent an agricultural field during harvesting and receives grain into the hopper 14 from a grain cart that in turn has been filled from a harvester, such as a combine, during the harvest operation. The combine can also be moved to the cart 10 for unloading the combine directly into the hopper 14. Preferably, the cart is used to fill containers while the containers are still on transport trailers. Alternatively, multiple containers 60 can be delivered to a field and placed on the ground surrounding the field. After the containers have been filled using the cart 10, the containers may be loaded on trailers for transport from the field. In this case, the cart 10 is lowered to reach the fill opening of the containers on the ground.

As an alternative to filling containers at harvest, the cart 10 can be used at a grain storage facility to load containers with stored grain. This can be at the farm site or elsewhere. In the preferred method of operation, the container 60 remains on the trailer 44 during the filling operation to avoid the need to handle the container at the storage site.

The cart 10 provides the grain producer with a means to readily fill shipping containers on the farm, either in the field or at a storage site. With the use of cart 10, greater utilization of intermodal shipping containers for the transport of grain can be achieved. The cart of the present invention is not limited to use in filling intermodal shipping containers but can be used to fill other types of containers such as truck trailers, either open top trailers or closed trailers, etc. with grain.

Having described the preferred embodiment, it will become apparent that various modifications can be made without departing from the scope of the invention as defined in the accompanying claims.

What is claimed is:

1. Apparatus for bulk filling an elongated container with a particulate material, the container having an opening at one end, the apparatus comprising:
    a hopper having an open upper end to receive particulate material and a lower outlet
    a conveyor having proximal and distal ends with the proximal end disposed beneath the hopper outlet for receiving material from the hopper, the conveyor extending away from the hopper outlet with a predetermined angle of upward inclination to the distal end, the conveyor being adapted to be positioned external of the container with the distal end adjacent the opening of the container, the conveyor being operable at a speed to throw the material through the opening and into an interior of the container, the material following an arcuate path as a function of the conveyor inclination and speed so as to reach the opposite end of the container whereby the container is substantially fillable from outside of the container; and,
    a lift assembly to raise and tower the hopper and conveyor to reach containers at various heights while maintaining the conveyor at the predetermined angle of inclination.

2. The apparatus as defined by claim 1 wherein the arcuate path is substantially parabolic.

3. The apparatus as defined by claim 1 wherein the conveyor has a belt operating at a speed between 1700 and 2300 feet per minute.

4. The apparatus as defined by claim 1 wherein the conveyor is inclined at about a 15 degree angle.

5. The apparatus as defined by claim 4 wherein the conveyor has a belt operating at a speed of about 2200 feet per minute.

6. The apparatus as defined by claim 1 further comprising wheels supporting the hopper and the conveyor whereby the apparatus is easily moved.

7. The apparatus as defined by claim 6 wherein the wheels are movable laterally to vary a tread width.

8. The apparatus as defined by claim 6 wherein the wheels are movable laterally outward to enable the apparatus to straddle a flat bed semi-truck trailer supporting the container and movable inward to reduce a tread width for road transport.

9. The apparatus as defined by claim 6 further comprising a frame, wheel arms rotatably mounted to the frame, the wheel arms carrying the wheels, and an actuator for rotating the wheel arms and holding the wheel arms in a selected position to adjust the height of hopper and conveyor.

10. The apparatus as defined by claim 1 further comprising a frame supporting the hopper and conveyor, the frame having height adjustable legs.

11. The apparatus as defined by claim 1 further comprising a frame with upper and lower portions with the hopper and the conveyor coupled to the upper portion, the upper portion being attached to the lower portion via removable fasteners whereby the frame upper portion, together with the hopper and conveyor, is removable from the lower portion.

12. The apparatus as defined by claim 1 wherein the conveyor is a belt conveyor.

13. The apparatus as defined by claim 12 wherein the conveyor is driven by a hydraulic motor.

14. The apparatus as defined by claim 12 wherein the conveyor is inclined upward at about a 15° angle to the distal end.

15. The apparatus as defined by claim 1 wherein a majority of the material follows the arcuate path without striking the top of the container.

16. Apparatus for filling an elongated intermodal container with an agricultural crop, the container having an opening at one end, the apparatus comprising:
    a support structure having a pair of laterally spaced and laterally adjustable wheels;
    a hopper having an open upper end to receive crop and a lower crop outlet, the hopper being carried by the support structure;
    a conveyor carried by the support structure having proximal and distal ends, the conveyor being disposed beneath the hopper outlet for receiving crop from the hopper and the conveyor extending away from the hopper outlet with a predetermined angle of upward inclination to the distal end thereof, the conveyor being adapted to be positioned external of the container with the distal end adjacent the opening of the container, the conveyor being operable at a speed to throw the crop through the opening and into the interior of the container, the crop following an arcuate path as function of the conveyor inclination and speed so as to reach an opposite end of the container to substantially fill the container from outside of the container; and
    a lift assembly to raise and lower the hopper and conveyor while maintaining the predetermined angle of conveyor inclination.

17. The apparatus as defined by claim 16 wherein the wheels are movable laterally outward to enable the apparatus to straddle a flat bed semi-truck trailer supporting a container and movable inward to reduce the tread width for road transport.

18. The apparatus as defined by claim 17 wherein the lift assembly includes wheel arms supporting the wheels and an actuator for rotating the wheel arms and holding the wheel arms in a selected position whereby the height of the hopper and conveyor is varied.

19. The apparatus as defined by claim 18 wherein the support structure includes a frame with upper and lower portions with the hopper and the conveyor coupled to the upper portion, the upper portion being attached to the lower portion via removable fasteners whereby the frame upper portion, together with the hopper and conveyor, are removable from the lower portion.

20. The apparatus as defined by claim 16 wherein the conveyor has a belt operating at a speed between 1700 and 2300 feet per minute.

21. The apparatus as defined by claim 16 wherein the conveyor is inclined at about a 15 degree angle.

22. The apparatus as defined by claim 21 wherein the conveyor includes a belt having an operating speed of about 2200 feet per minute.

23. The apparatus as defined by claim 16 wherein a majority of the material follows the arcuate path without striking the top of the container.

24. An apparatus for bulk filling a container with an agricultural crop comprising:
   a support structure;
   a hopper carried by the support structure having an open upper end to receive a crop and a lower outlet;
   a conveyor carried by the support structure having proximal and distal ends, the conveyor being disposed beneath the hopper outlet for receiving crop from the hopper and the conveyor extending away from the hopper outlet with a predetermined angle of upward inclination to the distal end thereof the conveyor being operable at a speed to throw the material through an opening of the container and into an interior of the container, the material following an arcuate path as a function of the conveyor inclination and speed so as to reach the opposite end of the container whereby the container is substantially fillable from outside of the container;
   wheels on the support structure to facilitate moving of the apparatus; and
   a lift assembly to raise and lower the hopper and the conveyor and maintain the predetermined angle of upward inclination of the conveyor over a range of conveyor vertical positions.

25. The apparatus as defined by claim 24 further comprising lateral adjustment means for moving the wheels laterally relative to the hopper and conveyor.

26. The apparatus as defined by claim 24 further comprising an adjustment mechanism to move the wheels laterally outward to straddle a flat bed truck trailer and to move the wheels laterally inward therefrom for road transport of the apparatus.

27. The apparatus as defined by claim 24 wherein the conveyor is operable at a speed to throw the crop through an opening and into the interior of the container, the crop following an arcuate path as a function of the conveyor inclination and speed so as to reach the opposite end of the container to substantially fill the container from outside of the container.

28. The apparatus as defined by claim 27 wherein a majority of the material follows the arcuate path without striking the top of the container.

29. The apparatus as defined by claim 24 wherein the conveyor is inclined at an angle of about 15 degrees and wherein the conveyor has a belt operating at a speed of 1700 to 2300 feet per minute.

30. An apparatus for bulk filling a container through a container opening with an agricultural crop comprising:
   a support structure;
   a hopper carried by the support structure having an open upper end to receive a crop and a lower outlet
   a conveyor carried by the support structure having proximal and distal ends, the conveyor being disposed beneath the hopper outlet for receiving crop from the hopper and the conveyor extending away from the hopper outlet with a predetermined angle of upward inclination to the distal end thereof the conveyor being operable at a speed to throw the crop through the opening and into an interior of the container, the crop following an arcuate path as a function of the conveyor inclination and speed so as to reach the opposite end of the container whereby the container is substantially fillable from outside of the container;
   a lift assembly to raise and lower the hooper and the conveyor and maintain the predetermined angle of upward inclination of the conveyor over a range of conveyor vertical positions; and,
   the support structure adapted to straddle a conventional highway transport flatbed truck to support the hopper and conveyor above the trailer.

31. The apparatus as defined by claim 30 wherein the support structure spans at least eight feet at a height of at least 60 inches.

32. The apparatus as defined by claim 30 wherein the conveyor is adapted to be positioned external of the container with the distal end adjacent the opening of the container, the conveyor being operable at a speed to throw the crop through the opening and into the interior of the container, the crop following an arcuate path as a function of the conveyor inclination and speed so as to reach the opposite end of the container to substantially fill the container from outside of the container.

33. The apparatus as defined by claim 32 wherein a majority of the material follows the arcuate path without striking the top of the container.

34. The apparatus as defined by claim 32 wherein the conveyor is inclined at an angle of about 15 degrees and wherein the conveyor has a belt operating at a speed of 1700 to 2300 feet per minute.

* * * * *